United States Patent [19]

Hirano

[11] Patent Number: 5,367,380
[45] Date of Patent: Nov. 22, 1994

[54] VELOCITY MODULATION APPARATUS FOR THREE-TUBE PROJECTION TV

[75] Inventor: Tsuyoshi Hirano, Tokyo, Japan

[73] Assignee: Sony Corporation, Tokyo, Japan

[21] Appl. No.: 963,835

[22] Filed: Oct. 20, 1992

[30] Foreign Application Priority Data

Oct. 25, 1991 [JP] Japan .................. 3-306642

[51] Int. Cl.⁵ .................. H04N 3/32; H04N 9/16; H04N 9/18; H04N 9/31
[52] U.S. Cl. .................. 348/626; 348/778
[58] Field of Search .................. 358/242, 162, 64, 166, 358/174, 60, 63, 96, 37, 237; 315/364, 403, 397; H04N 3/32, 9/16, 9/18, 9/31

[56] References Cited

U.S. PATENT DOCUMENTS

| | | | |
|---|---|---|---|
| 3,830,958 | 8/1974 | Fuse et al. | 358/162 X |
| 3,936,872 | 2/1976 | Miyaoka | 358/64 |
| 4,355,326 | 10/1982 | Lee | 358/37 |
| 4,394,089 | 7/1983 | McIntosh et al. | 358/60 X |
| 4,665,432 | 5/1987 | Shima | 358/166 |

FOREIGN PATENT DOCUMENTS 53-088524  8/1978  Japan ................ 358/162

OTHER PUBLICATIONS

Susumu Yoshida et al., "Achievement of High Picture Quality In Color CRTs with the Beam-Scan Velocity Modulation Method", IEEE Transactions on Consumer Electronics, vol. CE-23, No. 3, Aug. 1977, pp. 366-373.

Primary Examiner—James J. Groody
Assistant Examiner—Safet Metjahic
Attorney, Agent, or Firm—Lewis H. Eslinger; Jay H. Maioli

[57] ABSTRACT

In the velocity modulation apparatus for a three-tube projection television, an effective velocity modulation can be implemented under due consideration of humans eye's relative visibility characteristics with respect to the three primary colors of R, G and B, and the velocity modulation apparatus includes a VM signal extracting circuit 1 for extracting a velocity modulation (VM) signal from the luminance signal; a plurality of driving circuits 3 to 5 having three different gains at ratios of 0. 3:0. 59:0. 11; and a red color VM coil 7, a green color VM coil 8 and a blue color VM coil 9 provided for three corresponding Braun tubes, respectively and driven by the driving circuits 3 to 5, respectively. Since the respective gains of the driving circuits 3 to 5 are previously determined in correspondence to the eye's relative visibility of the three primary colors of R, G and B, it is possible to perform the velocity modulation being based on the practical emphasis at picture image contours, and thereby to eliminate wasteful power consumption.

2 Claims, 3 Drawing Sheets

VELOCITY MODULATION APPARATUS FOR THREE-TUBE PROJECTION TV

BACKGROUND OF THE INVENTION

1. Field of the Invention

The present invention relates to a velocity modulation apparatus for a three-tube projection television (TV), and more specifically to a velocity modulation apparatus for effectively implementing velocity modulation on the basis of human eye's relative spectral luminous efficiency (visibility) characteristics with respect to three primary colors, in a three-tube projection television.

2. Description of the Prior Art

There has been well known a velocity modulation technique such that the electron beam scanning speed can be controlled by modulating an electron beam scanning at a constant scanning speed on the surface of a Braun tube (cathode ray tube), with the use of a coil disposed externally of the electron gun, without controlling the intensity of the electron beam.

Since the picture image is relatively darkened when the electron beam scanning speed is high and relatively brightened when low, it is possible to emphasize the picture image contour. Accordingly, on the basis of the velocity modulation technique for implementing the contour compensation as described above, it is possible to virtually improve the focus status by- sharpening the change in brightness at the edge portions of a picture image.

FIG. 6 shows a velocity modulation (VM) apparatus used for a one-tube projection television provided with a single electron gun of a direct viewing tube (ordinary CTV) type.

The velocity modulation apparatus of this projection television includes a VM signal extracting circuit 1 for extracting a velocity modulation signal by detecting the change of a luminance signal Y, and a driving circuit 10 for driving a VM coil 12 by amplifying the velocity modulation signal outputted from the VM signal extracting circuit 1 at a predetermined amplification factor.

The VM coil 12 is disposed on a Braun tube, and energized in response to the velocity modulation signal. As a result, the horizontal deflection magnetic field is modulated by the magnetic field generated by this VM coil 12, so that a deflection current can be modulated. Owing to this modulation operation, the deflection speed is decelerated (or accelerated) during the leading period of the video signal and accelerated (or decelerated) during the trailing period thereof, so that the electron beam speed can be controlled.

In the above-mentioned modulation operation, when the deflection speed is decelerated, since the luminous time is prolonged, the picture image is brightened; on the other hand, when accelerated, since the luminous time is shortened, the picture image is darkened, so that a sharp image can be obtained.

FIG. 7 is a circuit diagram showing a velocity modulation apparatus for a prior art three-tube color projection television.

In this velocity modulation apparatus for a three-tube projection television, the velocity modulation apparatus for a one-tube projection television shown in FIG. 6 is modified so as to be applied to a velocity modulation apparatus for a three-tube projection television, in which a red color (R) VM coil 7, a green color (G) VM coil 8, and a blue color (B) VM coil 9 are connected in series to each other so as to be driven by a common driving circuit 10.

The red color VM coil 7, the green color VM coil 8 and the green color VM coil 9 are disposed on the corresponding one of the three Braun tubes, respectively so as to provide the contour compensation of picture images on the three Braun tubes, respectively.

In FIG. 7, the number of turns of each of these VM coils 7 to 9 is equal to each other, as shown by the turn ratios of (1):(1):(1) in FIG. 7.

In the velocity modulation apparatus of the three-tube projection television as shown in FIG. 7, since the number of turns of each of the VM coils 7 to 9 is the same and further because these coils 7 to 9 are energized by the common driving circuit 10, the intensity of magnetic field of each of these coils 7 to 9 is equal to each other. Therefore, the three Braun tubes are velocity-modulated under the same conditions.

However, the three primary colors R (red), G (green) and B (blue) are different from each other in the relative visibility (luminous factor) characteristics as shown in FIG. 2, in which the sensitivity of green is the highest; that of red is the medium; and that of blue is the lowest. Therefore, in the case of the velocity modulation technique by which the focus status can be improved virtually by sharpening the change in brightness at the edge portions of a picture image, there exist various problems in that the circuit configuration of the velocity modulation apparatus consumes power wastefully and therefore the efficiency is low, because the three primary colors of R, G and B are velocity-modulated under the same conditions, irrespective of the difference in the human's eye sensitivity among these. The above-mentioned wasteful power consumption inevitably causes a rise in temperature.

Further, being different from the circuit shown in FIG. 7, it may be possible to provide the red color VM coil 7, the green color VM coil 8 and the blue color VM coil 9 each having the same number of turns and connected in parallel to each other so as to be energized, independently by three separate driving circuits the same as the driving circuit 10 as shown in FIG. 7. In this case, however, the same problems as described above will arise.

SUMMARY OF THE INVENTION

With these problems in mind, therefore, it is the object of the present invention to provide a velocity modulation apparatus for a three-tube projection television by which the scanning velocity can be modulated effectively in accordance with the human eye's visibility characteristics.

To achieve the above-mentioned object, a velocity modulation apparatus for a three-tube projection television according to the present invention, for velocity modulating electron beams of display tubes on the basis of change in a luminance signal, comprises means for velocity modulating red and green lines in accordance with human eye's relative visibility characteristics with respect to at least red and green of three primary colors constituting the luminance signal.

In a specific embodiment of the present invention, the velocity modulation apparatus for a three-tube projection television comprises: a red color velocity modulation coil and a green color velocity modulation coil both having the same number of turns and arranged in parallel to each other; a circuit for extracting a velocity modulation signal from the luminance signal; and a velocity modulation circuit having at least two driving circuits arranged in parallel with each other for amplifying the velocity modulation signal extracted from said extracting circuit by gains determined so as to correspond to the relative visibility characteristics with respect to the respective colors, to energize said velocity modulation coils independently.

In another specific embodiment of the present invention, the velocity modulation apparatus for a three-tube projection television comprises: at least red color velocity modulation coil and green velocity modulation coil having two different numbers of turns from each other in accordance with the relative visibility characteristics and connected in series with each other; a circuit for extracting a velocity modulation signal from the luminance signal; and a single driving circuit for energizing said series-connected velocity modulation coils on the basis of the extracted velocity modulation signal.

Since the velocity modulation means modulates the velocities along at least R lines and G lines in accordance with the human eye's relative visibility, it is possible to obtain the preferable emphasis at picture image contours.

Further, the velocity of B lines can be preferably modulated. However, since the relative visibility of the B lines is low compared with the other two lines, it is possible to defocus only the B lines.

DETAILED DESCRIPTION OF THE PREFERRED EMBODIMENTS

Figure 1:
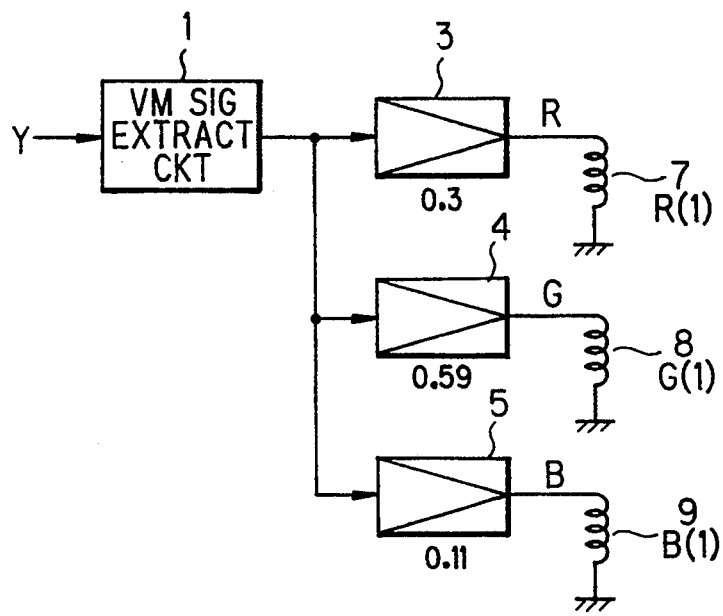
FIG. 1 is a circuit diagram showing a first embodiment of the velocity modulation apparatus for a three-tube projection television according to the present invention.

A first embodiment of the velocity modulation apparatus for a three-tube projection television will be described hereinbelow with reference to FIG. 1.

In the drawing, the velocity modulation apparatus comprises a VM (velocity modulation) signal extracting circuit 1, a first driving circuit 3, a second driving circuit 4, a third driving circuit 5, a red color VM (velocity modulation) coil 7, a green color VM coil 8, and a blue color VM coil 9. Three series-connected pairs (3 and 7, 4 and 8, 5 and 9) of driving circuits 3 to 5 and the VM coils 7 to 9 are connected to the VM driving circuit 1 in parallel to each other. In this embodiment, the number of turns of each of these VM coils 7, 8 and 9 is equal to each other.

Figure 2:
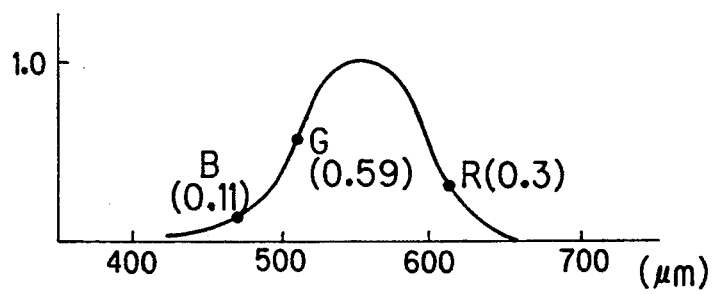
FIG. 2 is a graphical representation showing the relative visibility characteristics of the velocity modulation apparatus for the three-tube projection television shown in FIG. 1.

However, the gain G1 of the first driving circuit 3 for driving the red color VM coil 7, the gain G2 of the second driving circuit 4 for driving the green color VM coil 8, and the gain G3 of the third driving circuit 5 for driving the blue color VM coil 9 are different from each other, because each of these gains G1 to G3 are determined in accordance with the relative sensitivity characteristics as shown in FIG. 2.

Here, the relationship between the luminance signal Y and the three primary colors R, G and B can be expressed as follows:

$$Y = 0.3R + 0.59G + 0.11B \qquad (1)$$

Therefore, the ratios of the three gains G1, G2 and G3 are determined so as to correspond to the above coefficients of 0.3, 0.59 and 0.11.

Since the gains G1, G2 and G3 of the first, second and third driving circuits 3, 4 and 5 are determined as described above, the three primary color VM coils 7, 8 and 9 are energized by these driving circuits 3, 4, and 5, respectively with the intensities which correspond to the above-mentioned gains G1 to G3, respectively, because the number of turns of each of these coils is equal to each other.

As described above, although some coils are energized relatively weakly, since the intensities of these energized coils are equivalent to each other from the standpoint of relative visibility characteristics, no problem arises.

In the above-mentioned optimum coil energization conditions, when the maximum (reference) gain of the second green coil driving circuit 4 is 100%, the gain of the first red coil driving circuit 3 is determined to be about 50.8% and that of the third blue coil driving circuit 5 is determined to be about 18.6%, with the result that it is possible to eliminate the wasteful power consumption when these coils 7 to 9 are considered as a resultant load and therefore to reduce a rise in temperature of the Braun tubes.

Figure 3:
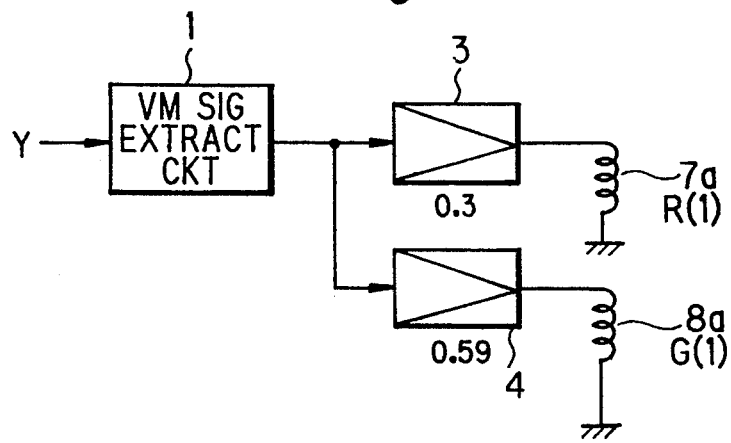
FIG. 3 is a circuit diagram showing a second embodiment of the velocity modulation apparatus for a three-tube projection television according to the present invention.

FIG. 3 shows a second embodiment of the velocity modulation apparatus for the three-tube projection television according to the present invention.

The velocity modulation apparatus comprises a VM signal extracting circuit 1, a first driving circuit 3, a second driving circuit 4, a red color VM coil 7a, and a green color VM coil 8a.

Two series-connected pairs (3 and 7a, 4 and 8a) of the driving circuits 3 and 4 and the VM coils 7a and 8a are connected to the VM driving circuit 1 in parallel to each other. In this embodiment, since the number of turns of each of these VM coils 7a and 8a is also equal to each other as shown by (1):(1) in FIG. 3 the gain G1 of the first driving circuit 3 and the gain G2 of the second driving circuit 4 are determined at the same above-mentioned ratio.

In this second embodiment, the velocity modulation apparatus for a projection television comprises no blue color VM coil 9 and no third driving circuit 5 for driving this blue color VM coil 9 both shown in FIG. 1.

This is because at present the blue (B) color fluorescent material is defocused by focus etching. In other words, the velocity modulation for blue color is not significant from both the standpoints of relative visibility and the fluorescent material. In this embodiment, therefore, it is possible to eliminate the velocity modulation for blue color on the basis of the present invention. In this second embodiment, since the third driving circuit 5 and the blue color VM coil 9 shown in FIG. 1 can be both eliminated, it is possible to reduce the apparatus cost markedly, as compared with the first embodiment shown in FIG. 1.

Figure 4:
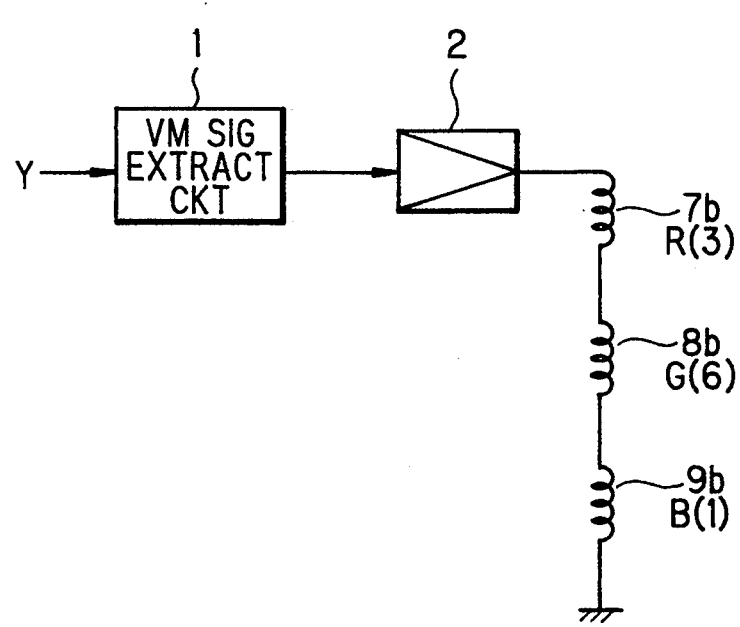
FIG. 4 is a circuit diagram showing a third embodiment of the velocity modulation apparatus for a three-tube projection television according to the present invention.

FIG. 4 shows a third embodiment of the velocity modulation apparatus for a three-tube projection television according to the present invention.

The velocity modulation apparatus comprises a VM signal extracting circuit 1; a driving circuit 2; and three series-connected red color VM coil 7b, a green coil 8b, and a blue color coil 9b.

Figure 7:
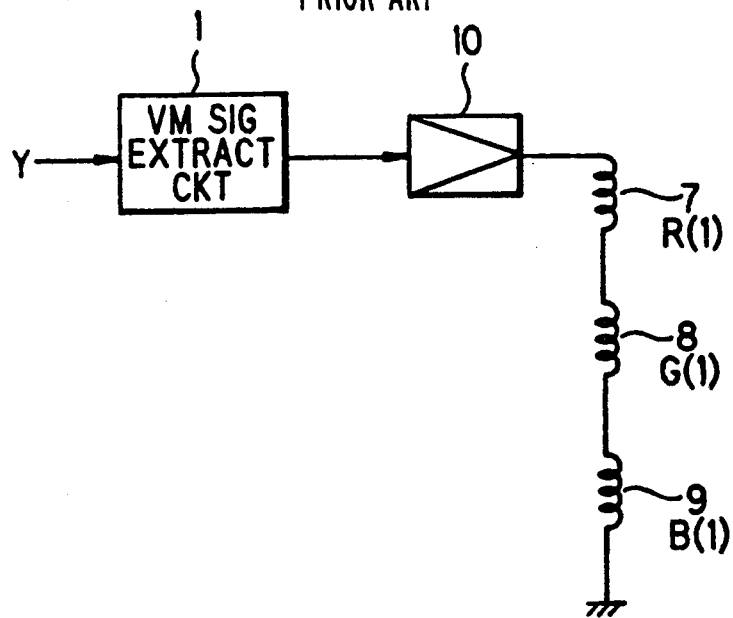
FIG. 7 is a circuit diagram showing a prior art velocity modulation apparatus for a three-tube projection television.

Although this second embodiment seems to be similar in configuration to the prior art circuit shown in FIG. 7, in this embodiment, the number of turns of each of these VM coils 7b, 8b and 9b is different from each other. That is, the numbers of turns of these coils 7b, 8b and 9b are so determined in correspondence to the human eye's relative visibility as expressed by equation (1).

Therefore, it is preferable to determine the ratios in the number of turns of these coils accurately as 0. 3:0. 59:0. 11. However, in this embodiment, the ratios of the red color VM coil 7b, the green color VM coil 8b and the blue color VM coil 9b are determined approximately as 3:6:1.

Although the same driving current is supplied from the common driving circuit 2 and passed through the three VM coils 7b to 9b, since the number of turns of each of these coils 7b to 9b is different from each other, it is possible to obtain the same practical velocity modulation effect as with the case of the first embodiment in the Braun tubes on which these coils 7b, 8b and 9b are installed.

Figure 5:
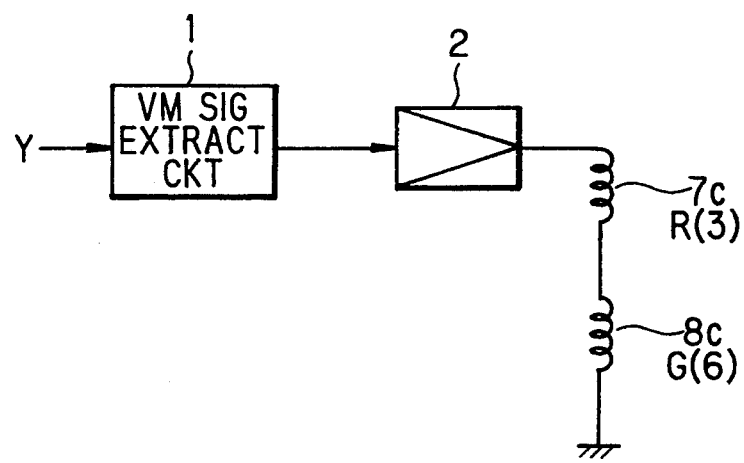
FIG. 5 is a circuit diagram showing a fourth embodiment of the velocity modulation apparatus for a three-tube projection television according to the present invention.
Figure 6:
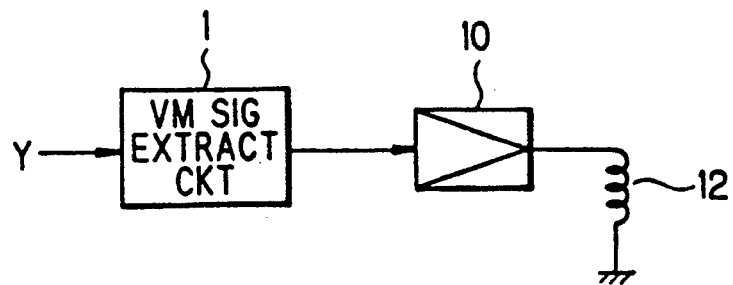
FIG. 6 is a circuit diagram showing a prior art velocity modulation apparatus for a single-tube projection television.

FIG. 5 shows a fourth embodiment of the velocity modulation apparatus for a three-tube projection television according to the present invention.

The velocity modulation apparatus comprises a VM signal extracting circuit 1, a driving circuit 2, and a series-connected red color VM coil 7c and green color VM coil 8c. The ratio in the number of turns of the red color VM coil 7c to the green color VM coil 8c is 3:6.

The circuit configuration of this embodiment shown in FIG. 5 is obtained by removing only the blue color VM coil 9b from the embodiment shown in FIG. 4. The reason why the blue color coil 9b can removed is the same as already explained in the second embodiment with reference to FIG. 3.

In this fourth embodiment, it is possible to reduce the circuit cost remarkably in the same way as with the case of the second embodiment shown in FIG. 3.

As described above, in the velocity modulation apparatus for a three-tube projection television according to the present invention, since the velocity modulation can be optimized in accordance with the human eye's relative visibility characteristics with respect to the three primary colors of red, green and blue, it is possible to reduce the power consumption and therefore a rise in temperature, without deteriorating the practical velocity modulation effect upon the Braun tubes.

In addition, since the velocity modulation for blue color of low sensibility can be eliminated as occasion demands, it is possible to markedly reduce the cost of the apparatus.

What is claimed is:

1. A velocity modulation apparatus for velocity modulating electron beams of display tubes on the basis of a luminance component of a composite color video signal in a three-tube projection television, comprising:

a velocity modulation extracting circuit for extracting a velocity modulation signal from the luminance component;

a red color driving circuit connected to amplify the velocity modulation signal from said velocity modulation extracting circuit by a first gain and a red color velocity modulation coil connected in series with said red color driving circuit and having a predetermined number of turns;

a green color driving circuit connected to amplify the velocity modulation signal from said velocity modulation extracting circuit by a second gain and a green color velocity modulation coil connected in series with said green color driving circuit and having said predetermined number of turns, said green color driving circuit and green color velocity modulation coil being connected in parallel with said red color driving circuit and said red color velocity modulation coil; and a blue color driving circuit connected to amplify the velocity modulation signal from said velocity modulation extracting circuit by a third gain and a blue color velocity modulation coil connected in series with said blue color driving circuit and having said predetermined number of turns, said blue color driving circuit and said blue color velocity modulation coil being connected in parallel with said red color driving circuit and said red color velocity modulation coil, wherein said first, second, and third gains are unequal and are selected in accordance with the human eye's relative visibility characteristics with respect to three primary colors constituting a chrominance component of said color video signal.

2. A velocity modulation apparatus for velocity modulation electron beams of display tubes on the basis of a luminance component of a composite color video signal in a three-tube projection television, comprising:

a velocity modulation extracting circuit for extracting a velocity modulation signal from the luminance component;

a red color velocity modulation coil having a first predetermined number of turns;

a green color velocity modulation coil connected in series with said red color velocity modulation coil and having a second, different predetermined number of turns;

a blue color velocity modulation coil connected in series with said red and green color velocity modulation coils and having a third, different predetermined number of turns; and a single driving circuit receiving said velocity modulation signal from said velocity modulation extracting circuit for energizing the series connected red, green, and blue color velocity modulation coils, wherein said first, second, and third predetermined number of turns are selected in accordance with the human eye's relative visibility characteristics with respect to three primary colors constituting a chrominance component of the composite color video signal.

* * * * *